A. J. MASON.
PROCESS OF TREATING FRESHLY CUT CROPS.
APPLICATION FILED OCT. 24, 1914.
1,264,955.
Patented May 7, 1918.
2 SHEETS—SHEET 2.
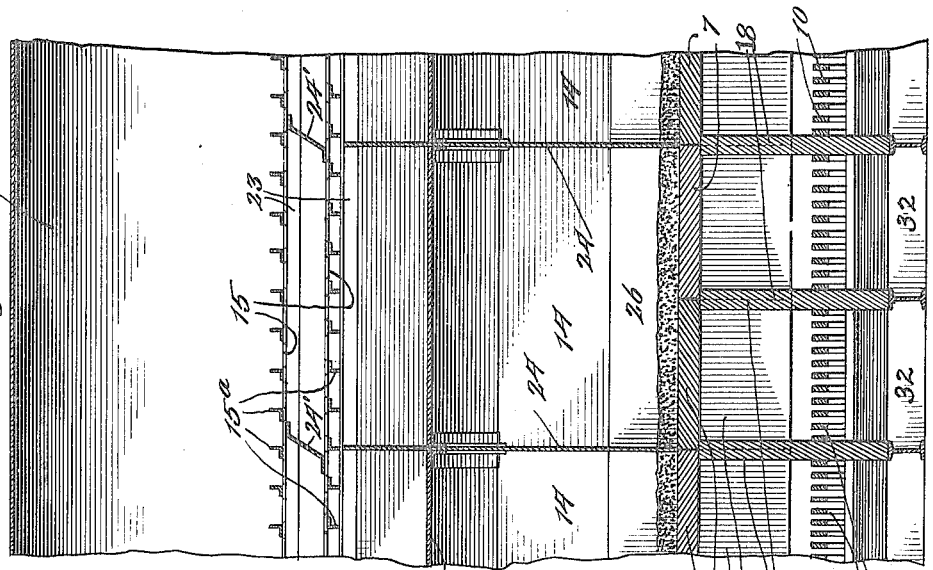
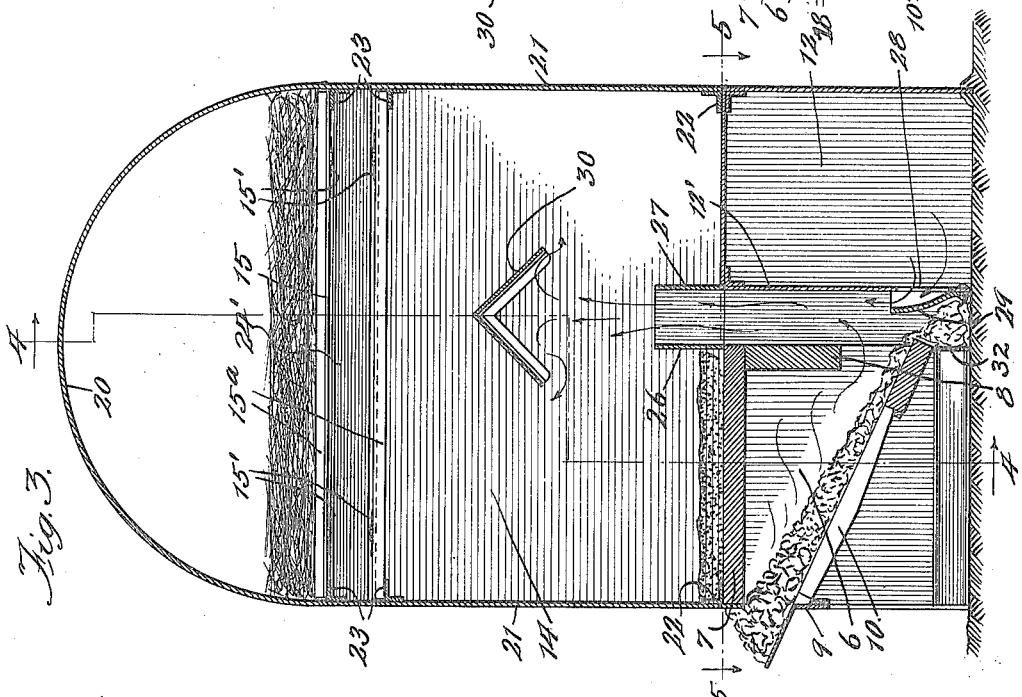

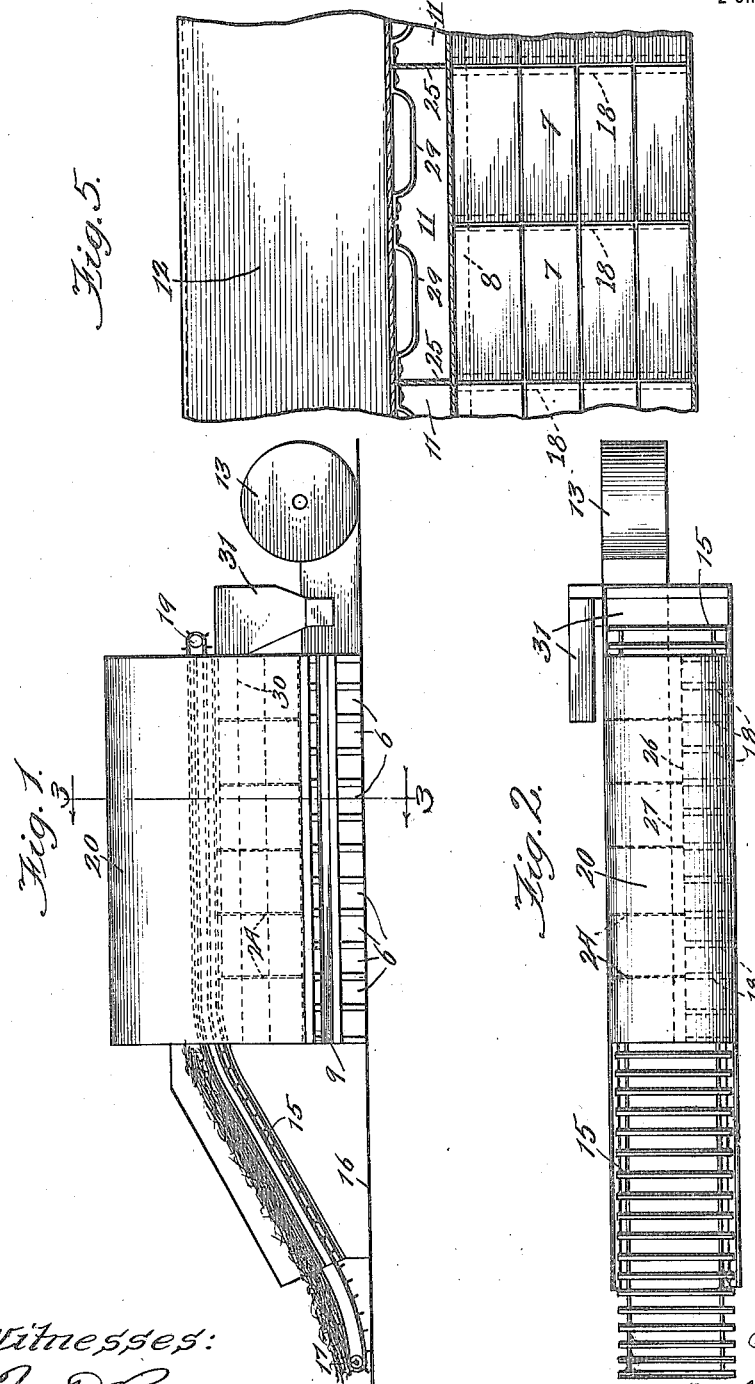

UNITED STATES PATENT OFFICE.

ARTHUR J. MASON, OF CHICAGO, ILLINOIS.

PROCESS OF TREATING FRESHLY-CUT CROPS.

1,264,955. Specification of Letters Patent. Patented May 7, 1918.

Application filed October 24, 1914. Serial No. 868,504.

*To all whom it may concern:*

Be it known that I, ARTHUR J. MASON, a citizen of the United States, residing at Chicago, in the county of Cook and State of Illinois, have invented a new and useful Process of Treating Freshly-Cut Crops, of which the following is a specification.

The main object of my invention is to remove the present loss to hay and grain crops resulting from the fact that they are dried or cured in the open air. These enormous losses of the material itself, of time, and also that resulting from the unnecessary occupation of the land during the valuable growing season, are chiefly due to the caprices of the weather, that is, rain showers.

It is safe to say that these losses aggregate, in the United States alone, hundreds of millions of dollars each year. Statistics show that hay is highest in price in just those sections where it grows most abundantly naturally, whereas it is lowest in price where it grows but sparsely naturally;—a situation due to the fact that the elements which assist growing grain crops are the same which interfere with curing them, to-wit, a humid atmosphere and frequent rains.

I also find that the price of hay has ruled for long periods at as high a figure per pound as grain. This fact demonstrates the uncertainty, disappointments, and wastefulness which dominate the making of hay in the eastern half of the United States as at present conducted.

The art of artifically drying a great variety of materials is well known, but none of these known driers or processes is adapted to this work. They do not fit into the practice of handling such crops, they would be too extensive to deal with bulky material, they are not of a sufficiently portable character to be moved readily; in short, they are too complex and expensive for a number of reasons.

The practice of making hay from natural grasses over the most of this country is due mainly to the fact such grasses are fine in texture and comparatively easily dried. Crops such as wheat, oats, barley, millet, etc., make more in weight per acre and a better quality of hay than natural grasses, but it is only where the climate permits of their being dried under natural conditions with reasonable certainty that such grains are used for hay,—notably in California, Australia, South Africa, Texas, and other places with like climatic conditions. Again, under the practice obtaining almost universally at the present time, hay-making is crowded into a period of a few days, or, at, most, a few weeks, in each year—a practice obviously far more wasteful and less economical for a variety of reasons than would be the case could the hay-making period be extended substantially continuously and uninterruptedly over the spring, summer and fall months.

It is also known that in the ordinary process of harvesting and curing hay a considerable loss of food values takes place, independently of loss resulting from partial or complete spoiling by fermentation, mildew, or like causes, owing to the fact that the grass or grain is cut and cured at a time when its maximum protein value has passed. It is a fact perhaps not generally known that, in the case of oats, in the stage of development known as "in the milk" the stalk contains nearly as much protein as the seed or grain, and this is true in nearly the same degree of the other grains; whereas, if cutting is delayed until the grain passes into the yellow stage, a large part of this protein in the stalk has disappeared. This should make apparent the desirability and advantage of harvesting the crop for hay purposes when it is "in the milk". At this stage, however, the greater amount of moisture in the grain obviously makes the curing by natural methods more difficult and uncertain, and hence the practice has continued of sacrificing a large proportion of the food value for the sake of more easily and certainly saving the residue of such food value. It should be plain, therefore, that if some practicable method can be found of quickly drying and curing grain that is freshly cut at a stage of its development when its food value is highest, a great saving and advantage to the growers and users of such crops should result.

My present invention, which embodies such a method of treating freshly cut crops, contemplates the drying and curing of the same by artificial means. I have discovered that the best results are obtained if the drying agent is directed against and through a comparatively thin layer or mat of the material, especially where such layer or mat is moved slowly edgewise across the path of flow of the drying agent for a sufficent time to effect such a drying and curing action as prevents any subsequent fermentation. I have also discovered that a moderate amount of smoke in the drying agent is beneficial, and seems to add palatability as well as introducing an anti-septic agent, and incidentally a sulfurous atmosphere desirable where vegetable matter is to be dried and preserved. I have also found that if the artificially dried and cured product be baled immediately after the curing operation, instead of being allowed to remain in a more or less loose condition exposed to atmospheric influences, there is a considerable further conservation of the food values.

In order that my invention may be more clearly and fully understood I have illustrated in the accompanying drawings one practical form of apparatus that I have found, by actual operation, may be successfully employed in carrying out my improved process; and I will now proceed to describe the latter in detail by reference to and in connection with said apparatus as shown in the drawings, in which—

Figure 1 is a side elevation of the complete apparatus;

Fig. 2 is a top plan view;

Fig. 3 is an enlarged cross-section on the line 3—3 of Fig. 1;

Fig. 4 is an enlarged fragmentary longitudinal section on the offset line 4—4 of Fig. 3; and Fig. 5 is an enlarged fragmentary horizontal section on the line 5—5 of Fig. 3.

In the drawings 6 designates each of a battery of furnaces disposed side by side and each comprising top, rear and side walls 7, 8 and 18 respectively, of fire brick, a front wall 9, a downwardly and rearwardly inclined grate 10. A vertical smoke flue 11 behind the rear wall 8 serves a pair of adjacent furnaces. Extending alongside and in rear of the several furnaces is a chamber 12 having the functions of an air conductor and pressure-equalizing chamber, and supplied with air under suitable pressure delivered by a fan 13 connected into one end of said chamber. Surmounting the row of furnaces and the air conductor is a mixing and equalizing chamber 14, through the upper portion of which runs an endless slat conveyer 15 which, at one end, is inclined downwardly to the ground, indicated at 16, its lower or receiving end being mounted on a conveyer drum 17, and the portion of the conveyer traveling through the mixing and equalizing chamber 14 being suitably supported and guided at its outer end on a drum 19. Surmounting the elevated portion of the conveyer is a hood or dome 20 conveniently made of sheet metal and open at both ends, the sides of which may be extended downwardly to form the side walls 21 of the mixing and equalizing chamber, the lower ends of said side walls resting upon the top walls of the furnaces and of the air conductor and being sealed thereon by angle irons 22.

The conveyer 15 is conveniently formed of two lines of link belts or chains 15′ connected by cross bars or slats 15ª, the ends of which latter are supported by angle rails 23 secured to the side walls 21 of the mixing and equalizing chamber. This construction provides an open or skeleton conveyer that offers practically no obstruction to the passage of the heating agent therethrough.

The mixing and equalizing chamber 14 is divided by transverse partition walls or diaphragms 24 into a plurality of sections each of which, as shown, extends over a pair of furnaces; the space between the rear wall 8 of the furnaces and the inner wall 12′ of the air conductor is similarly divided by transverse partition walls 25 (Fig. 5), thereby forming the flues 11, and said flues are extended upwardly some distance into the mixing and equalizing chamber by guide-plates 26 and 27 (Fig. 3) that form in effect vertical extensions of the rear furnace wall and the inner air conductor wall and extend between adjacent partition walls 24. Between the upper and lower laps of the conveyer are also interposed partitions 24′ substantially in line with the partitions 24.

The air conductor communicates with the lower ends of the several furnace flues through openings 28 in the wall 12′, the air being directed upwardly by means of suitable shaped castings 29 fastened to the inner side of wall 12′ over said openings.

Extending lengthwise of the mixing and equalizing chamber 14 centrally above the tops of the several flues 11 is a baffle 30 of inverted V shape serving to deflect and disperse the commingled air and gases flowing upwardly through the flues and prevent live sparks therein from striking the load of material on the conveyer.

At the delivery end of the conveyer is a hay-press indicated at 31 arranged to receive the dried hay directly from the conveyer and bale the same.

In the use of the apparatus shown and described the material to be cured is cut and delivered in a green condition to the foot of the conveyer by suitable tools, and is spread upon the latter in a layer of approximately uniform thickness and density, preferably about one foot deep. The conveyer travels with its load at a speed of about three feet per minute in the case of a drier having a length of about fifty feet. The furnaces and fan being in operation, the body of air in the conductor or equalizing chamber 12, which is maintained at a constant pressure of about three-fourths of an ounce, rushes upwardly through the flues 11, inducing a powerful draft in the furnaces and commingling with the gases of combustion from the latter. The area of the air supply openings into the flues 11 is such as to maintain the fan pressure at these openings, and the air therefore passes therefrom at a high velocity, approximately 4,000 feet per minute; this blast striking the baffle 30 and being dispersed thereby throughout the entire cross sectional area of the mixing and equalizing chamber. The quantity of air delivered bears such proportion to the gases of combustion that the resulting mixture of air and furnace gases has a temperature of about 400° F. and is in such quantities as to furnish a flow upward through the hay on the conveyer of about 150 feet per minute; that is, 150 cu. ft. of hot air flows through each square foot of area in the traveling mat of hay each minute. Under these conditions I find that in passing through the hay the temperature will fall from 400° F. to 150° F., at which last named temperature the air is almost completely saturated. Under these conditions by subjecting any given portion of the material to the drying treatment for a period under 15 minutes, I find that such material is thoroughly dried and cured. The partitions or diaphragms 24 and 24' serve the purpose of controlling the upward movement of the heated air and gases in the mixing and equalizing chamber so as to distribute the same throughout the full length of the latter, so that in great measure the hay will receive uniform quantities of the drying agent throughout its entire travel through the drying chamber.

The type of furnace shown and described is excellently adapted to the purposes of the present invention, since it burns the fuel very thoroughly and gives off but little smoke. In the handling of the furnace green coal is added from time to time at the receiving end of the grate, where a seal is maintained, the whole fire being pushed down over the grate from time to time, and the ashes may be removed from beneath the lower end of the grate by opening an ash door 32 and raking the ashes out. The amount of smoke commingling with the air and passing through the hay is so small as to cause little or no perceptible smell or discoloration. The continuous upward flow of air through the flues induces a draft through the grate bars and fires sufficiently strong to heat the inclosing fire brick to a white heat, a condition very favorable for minimizing smoke.

It will be observed that the draft through the grate bars is completely caused or induced by the outflowing supply of air from the fan through the conductor. If this flow be increased, then the rate of combustion is increased correspondingly. If the rate of flow be diminished then the rate of combustion is diminished. In this manner there is automatically maintained within reasonable limits a certain desired economical temperature underneath the traveling mat of hay which has been stated as about 400° F. The volume of this flow of air treated by admixture with the furnace gases is limited by the fact that if it be too great the material to be dried will be displaced or blown away. Upon its quantity and temperature will therefore depend the capacity of the apparatus. The vertical height of the flue 11 will fix the intensity of the induced draft through the grate-bars and fire. Therefore, by increasing or diminishing this distance, a higher or lower temperature will result in the chamber 14.

It must be borne in mind that the nature of the material dried is very inflammable. It is therefore of the highest importance to insure against too high a temperature. The difficulties and subtleties of these operations may be gathered from the fact that in the past two seasons of operation in the field, I have found that a temperature of 400° F. applied for something less than a quarter of an hour—sufficiently long a period to completely dry the crop—will do no harm; whereas a prolonged exposure of the same material to as low a temperature as 300° F. will ignite and destroy it.

It may be further observed that in the described construction little waste of heat by radiation takes place. On the firing side the draft is, of course, inward; and the air conductor prevents radiation on the opposite side. Above the tops of the flues the temperature is so reduced and the exterior surface so small in area that waste from radiation is trivial.

By my improved method it is possible to perfectly dry out and cure green freshly cut grass and grain in from fifteen to twenty minutes, as compared with a period of several days under favorable weather conditions required under the natural process of curing. The utilization of the gases of combustion directly as part of the drying agent contributes substantially to the economy of the process, without effecting any deterioration of the product, but rather an advantage, as I have found that the very slight smoky flavor sometimes imparted to the product is not at all objectionable to cattle or other stock feeding upon the same, and acts as a preservative. By baling immediately after curing, a further economy of the food values is secured, as already pointed out. Perhaps the greatest advantages of my improved process, however, lie in the facts that it enables the haying operation to be carried on practically continuously throughout the entire growing season, irrespective of weather conditions, enables the crop to be harvested and cured at the stage of its development when it is highest in food values, and entirely eliminates the present enormous waste and loss resulting from bad weather conditions during the harvest season.

The apparatus shown and described is not claimed herein, but forms the subject-matter of Letters Patent No. 1,191,980, granted to me July 25, 1916.

I claim:

1. The herein described process of artificially curing freshly cut crops, which consists in bringing the material to be treated into the form of a layer or mat of approximately uniform thickness and density, and then forcing a body of commingled heated air and products of combustion through said layer from one side thereof until the moisture is expelled therefrom, and simultaneously venting all of the moisture laden drying agent freely to the atmosphere.

2. The herein described process of artificially curing freshly cut crops, which consists in bringing the material to be treated into the form of a layer or mat of approximately uniform thickness and density, moving said layer edgewise at a slow rate of travel, and, during such travel, subjecting said layer to the action of a body of commingled heated air and products of combustion, and simultaneously venting all of the moisture laden drying agent to the atmosphere.

3. The herein described process of artificially curing freshly cut crops, which consists in bringing the material to be treated into the form of a layer or mat of approximately uniform thickness and density, and then forcing a gas heated to a temperature of approximately 400° F. through said layer from one side thereof until the moisture is expelled therefrom, and simultaneously venting all of the moisture laden gas freely to the atmosphere.

4. The herein described process of artificially curing freshly cut crops, which consists in bringing the material to be treated into the form of a layer or mat of approximately uniform thickness and density, moving said layer edgewise at a slow rate of travel, and, during such travel, subjecting said layer to the action of a body of commingled air and products of combustion at a temperature of approximately 400° F. forced through the same sidewise, and simultaneously venting all of the moisture laden drying agent freely to the atmosphere.

5. The herein described process of artificially curing and preserving freshly cut crops, which consists in gathering the cut crop in the form of a continuous extended layer of substantially uniform thickness and density, moving said layer endwise at a uniform slow rate of travel, forcing commingled air and products of combustion at a temperature of approximately 400° F. sidewise through said layer during such travel, and simultaneously venting all of the moisture laden gas freely to the atmosphere and finally baling the dried product immediately on completion of the drying operation to prevent evaporation of volatile food substance contained therein.

6. The herein described process of treating freshly cut crops, which consists in causing the material to be dried to pass in a traveling mat, and passing through it by pressure a mass of air commingled with the gases of combustion of a furnace so arranged that the quantity of air furnished shall determine the rate of combustion in said furnace, and therefore fix the temperature of the commingled air and furnace gases.

ARTHUR J. MASON.

Witnesses:
S. N. POND,
A. G. LATIMER.